US010665873B2

(12) United States Patent
Ohmori et al.

(10) Patent No.: US 10,665,873 B2
(45) Date of Patent: May 26, 2020

(54) RESIN FRAME EQUIPPED MEMBRANE ELECTRODE ASSEMBLY FOR FUEL CELL AND METHOD OF PRODUCING THE SAME

(71) Applicant: HONDA MOTOR CO., LTD., Minato-Ku, Tokyo (JP)

(72) Inventors: Suguru Ohmori, Wako (JP); Yukihito Tanaka, Wako (JP); Yoshihito Kimura, Wako (JP); Ryugo Fujitsuka, Wako (JP); Shintaro Tanaka, Wako (JP); Masaki Tani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 629 days.

(21) Appl. No.: 15/296,618

(22) Filed: Oct. 18, 2016

(65) Prior Publication Data

US 2017/0117560 A1 Apr. 27, 2017

(30) Foreign Application Priority Data

Oct. 21, 2015 (JP) ................................ 2015-207259
Oct. 22, 2015 (JP) ................................ 2015-208423

(51) Int. Cl.
*H01M 8/0273* (2016.01)
*H01M 8/0284* (2016.01)
(Continued)

(52) U.S. Cl.
CPC ....... *H01M 8/0273* (2013.01); *H01M 8/0284* (2013.01); *H01M 8/0286* (2013.01);
(Continued)

(58) Field of Classification Search
CPC ............. H01M 8/0273; H01M 8/1018; H01M 8/0286; H01M 8/0284; H01M 8/1004;
(Continued)

(56) References Cited

U.S. PATENT DOCUMENTS

| 9,966,623 B2 | 5/2018 | Tanaka et al. |
| 10,141,592 B2 | 11/2018 | Sugiura et al. |

(Continued)

FOREIGN PATENT DOCUMENTS

| CN | 103828107 A | 5/2014 |
| JP | 2014-220163 A | 11/2014 |

(Continued)

OTHER PUBLICATIONS

Office Action dated Dec. 4, 2018 issued over the corresponding Japanese Patent Application 2015-207259 with the English translation thereof.

(Continued)

*Primary Examiner* — Milton I Cano
*Assistant Examiner* — Philip A. Stuckey
(74) *Attorney, Agent, or Firm* — Carrier Blackman & Associates, P.C.; Joseph P. Carrier; William D. Blackman

(57) ABSTRACT

A resin frame equipped membrane electrode assembly includes an MEA having different sizes of components, and a resin frame member. A resin melt portion is provided for the resin frame member. The inside of a first gas diffusion layer is impregnated with resin as a part of the resin melt portion. A thin portion is provided at an outermost peripheral portion of the resin frame member through a step at an outermost peripheral portion of the resin melt portion, and the thin portion is thinner in a thickness direction than the resin melt portion.

1 Claim, 6 Drawing Sheets

(51) Int. Cl.
  *H01M 8/0286* (2016.01)
  *H01M 8/1004* (2016.01)
  *H01M 8/1018* (2016.01)

(52) U.S. Cl.
  CPC ....... *H01M 8/1004* (2013.01); *H01M 8/1018* (2013.01); *H01M 2008/1095* (2013.01); *H01M 2250/20* (2013.01); *Y02E 60/521* (2013.01); *Y02T 90/32* (2013.01)

(58) Field of Classification Search
  CPC ...... H01M 2250/20; H01M 2008/1095; Y02E 60/521; Y02T 90/32
  See application file for complete search history.

(56) References Cited

U.S. PATENT DOCUMENTS

| | | | |
|---|---|---|---|
| 2013/0183604 A1* | 7/2013 | Tanaka | H01M 8/0289 429/480 |
| 2014/0017590 A1 | 1/2014 | Sugishita et al. | |

FOREIGN PATENT DOCUMENTS

| | | |
|---|---|---|
| JP | 2015-076286 A | 4/2015 |
| WO | 2012/137609 A1 | 10/2012 |

OTHER PUBLICATIONS

Office Action including search report dated Dec. 3, 2018 issued over the corresponding Chinese Patent Application No. 201610902948.5 application with a partial English translation thereof.

\* cited by examiner

RESIN FRAME EQUIPPED MEMBRANE ELECTRODE ASSEMBLY FOR FUEL CELL AND METHOD OF PRODUCING THE SAME

CROSS-REFERENCE TO RELATED APPLICATIONS

This application is based upon and claims the benefit of priority from Japanese Patent Applications No. 2015-207259 filed on Oct. 21, 2015, and No. 2015-208423 filed on Oct. 22, 2015, the contents all of which are incorporated herein by reference.

BACKGROUND OF THE INVENTION

Field of the Invention

The present invention relates to a resin frame equipped membrane electrode assembly for a fuel cell. The resin frame equipped membrane electrode assembly includes an MEA having different sizes of components, i.e., an MEA including a solid polymer electrolyte membrane and a first electrode and a second electrode having different surface sizes sandwiching the solid polymer electrolyte membrane therebetween. The resin frame equipped membrane electrode assembly includes a resin frame member provided around the outer periphery of the MEA. Further, the present invention relates to a method of producing the resin frame equipped membrane electrode assembly.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) in which an anode and a cathode are provided on both sides of the solid polymer electrolyte membrane. Each of the anode and the cathode includes a catalyst layer (electrode catalyst layer) and a gas diffusion layer (porous carbon).

In the fuel cell, the membrane electrode assembly is sandwiched between separators (bipolar plates) in order to form a power generation cell (unit cell). A predetermined number of such power generation cells are stacked together to form a fuel cell stack. In use, for example, the fuel cell stack is mounted in a vehicle as an in-vehicle fuel cell stack.

In some cases, the membrane electrode assembly has a structure in which components of the MEA have different sizes, i.e., the surface size of one of the gas diffusion layers is smaller than the surface size of the solid polymer electrolyte membrane, and the surface size of the other of the gas diffusion layers is the same as the surface size of the solid polymer electrolyte membrane. In this regard, for the purpose of reducing the amount of expensive material used for the solid polymer electrolyte membranes, and for protecting the solid polymer electrolyte membranes which are thin and have low strength, frame equipped MEAs including resin frame members provided around the outer periphery of the solid polymer electrolyte membranes have been adopted.

A resin frame equipped MEA, for example, an "electrolyte membrane-electrode assembly for fuel cells, and method for producing same" is known, as disclosed in International Publication No. WO 2012/137609. The membrane electrode assembly includes a resin frame member provided around the outer periphery of a solid polymer electrolyte membrane, and an impregnation portion for joining the resin frame member and at least one of an outer peripheral edge portion of a first electrode and an outer peripheral edge portion of a second electrode together.

SUMMARY OF THE INVENTION

In this regard, in the case of melting the resin frame member in order to provide the impregnation portion, heat input at high temperature is applied to the resin frame member. Therefore, deformation, melting, etc., tend to occur easily due to such heat, and the resin frame member may develop uneven surfaces, which is undesirable. In some cases, seal members of separators contact the outer peripheral edge portion of the resin frame member. Therefore, if the resin frame member has such uneven surfaces, unwanted gaps may be formed between the resin frame member and contact surfaces (seal surfaces) of the seal members. Consequently, leakage of reactant gases or a coolant may occur.

Further, in cases where an outer peripheral edge portion of a gas diffusion layer having an especially large surface size and the resin frame member are joined together by the impregnation portion, a portion of the resin frame member where the MEA is to be provided functions as a receiver that receives the impregnation portion. Therefore, depending on the shape of the resin frame member, at the time of impregnation, the load may not be applied uniformly to the impregnation portion. Consequently, defects such as cracks, etc., may be formed in the resin frame member, and insufficient impregnation may occur. Under such circumstances, a stable joining quality may not be obtained.

The present invention has been made in order to solve problems of this type, and an object of the present invention is to provide a resin frame equipped membrane electrode assembly for a fuel cell and a method of producing the resin frame equipped membrane electrode assembly, in which, at the time of producing a resin melt portion, an outer peripheral surface of a resin frame member is not affected by heat, and thus a desired seal surface is formed reliably on the resin frame member. Another object of the present invention is to provide a resin frame equipped membrane electrode assembly having a simple structure, in which it is possible to obtain an impregnation portion having a stable quality reliably and easily.

According to an aspect of the present invention, a resin frame equipped membrane electrode assembly for a fuel cell includes an MEA having different sizes of components, and a resin frame member. The MEA includes a first electrode provided on one surface of a solid polymer electrolyte membrane, and a second electrode provided on another surface of the solid polymer electrolyte membrane. The first electrode includes a first electrode catalyst layer and a first gas diffusion layer. The second electrode includes a second electrode catalyst layer and a second gas diffusion layer. The surface size of the first electrode is larger than the surface size of the second electrode. The resin frame member is provided around the outer periphery of the solid polymer electrolyte membrane.

A resin melt portion is provided for the resin frame member. The first gas diffusion layer is impregnated with part of the resin melt portion. A thin portion is provided at an outermost peripheral portion of the resin frame member through a step at an outermost peripheral portion of the resin melt portion, and the thin portion is thinner than the resin melt portion in a thickness direction.

According to another aspect of the present invention, a resin frame equipped membrane electrode assembly for a fuel cell includes an MEA having different sizes of components and a resin frame member. The MEA includes a first electrode provided on one surface of a solid polymer electrolyte membrane, and a second electrode provided on another surface of the solid polymer electrolyte membrane. The first electrode includes a first electrode catalyst layer and a first gas diffusion layer. The second electrode includes a second electrode catalyst layer and a second gas diffusion layer. The surface size of the first electrode is larger than the surface size of the second electrode. The resin frame member is provided around the outer periphery of the solid polymer electrolyte membrane.

Further, the resin frame member includes an inner expansion, a shelf, and a resin impregnation area. The inner expansion is expanded toward the second electrode. The shelf is provided at an outer peripheral end of the inner expansion. The shelf is thicker than an inner peripheral portion of the inner expansion in a thickness direction through a step, and contacts an outer peripheral edge of the solid polymer electrolyte membrane. In the resin impregnation area, which is a thin portion impregnated with resin, the thin portion being formed by compressing the outer peripheral edge of the first gas diffusion layer in the thickness direction.

In the resin frame member, a shelf origin position of the shelf, a thin portion origin position which is an inner end of the thin portion, and an impregnation area origin position which is an inner end of the resin impregnation area line up outwards in this order, and are spaced from one another.

Further, according to another aspect, in a method of producing a resin frame equipped membrane electrode assembly for a fuel cell, a resin frame member is produced so as to include a projection positioned outside the outer periphery of the first gas diffusion layer and protruding in a thickness direction. Further, the MEA is positioned on an inner peripheral side of the resin frame member, and thereafter, the projection is melted. Consequently, a resin melt portion is provided. The first gas diffusion layer is impregnated with part of the resin melt portion. Further, a thin portion is provided at an outermost peripheral portion of the resin frame member through a step at an outermost peripheral portion of the resin melt portion. The thin portion is thinner than the resin melt portion in the thickness direction.

Further, preferably, the resin frame member includes a bank positioned outside the projection, and which is thinner than the projection in the thickness direction, wherein the bank is buried in the resin melt portion.

In the present invention, the thin portion is provided at the outermost peripheral portion of the resin frame member through the step at the outermost peripheral portion of the resin melt portion. Further, the thin portion is thinner than the resin melt portion in the thickness direction. Therefore, when the resin melt portion is formed, heat due to heat input is not easily transmitted to the outermost peripheral portion of the resin frame member. Thus, it is possible to prevent deformation due to such heat input, as well as to prevent the occurrence of melting, etc. Accordingly, when the resin melt portion is provided, the outer peripheral surface of the resin frame member is not affected by heat, and a desired seal surface can be provided on the resin frame member.

Further, in the present invention, at the time of impregnation, the shelf origin position of the shelf of the resin frame member, which functions as a receiver of the resin impregnation area, is positioned inside of the thin portion origin position and the impregnation area origin position. Thus, a movable die member, which applies heat and pressure at the time of impregnation, is positioned within the area of the shelf of the resin frame member, and the load of the movable die can be received reliably by the shelf. Accordingly, with a simple structure, it becomes possible to suppress damage from occurring to the resin frame member as much as possible, and to reliably and easily obtain a resin impregnation area having a stable quality.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
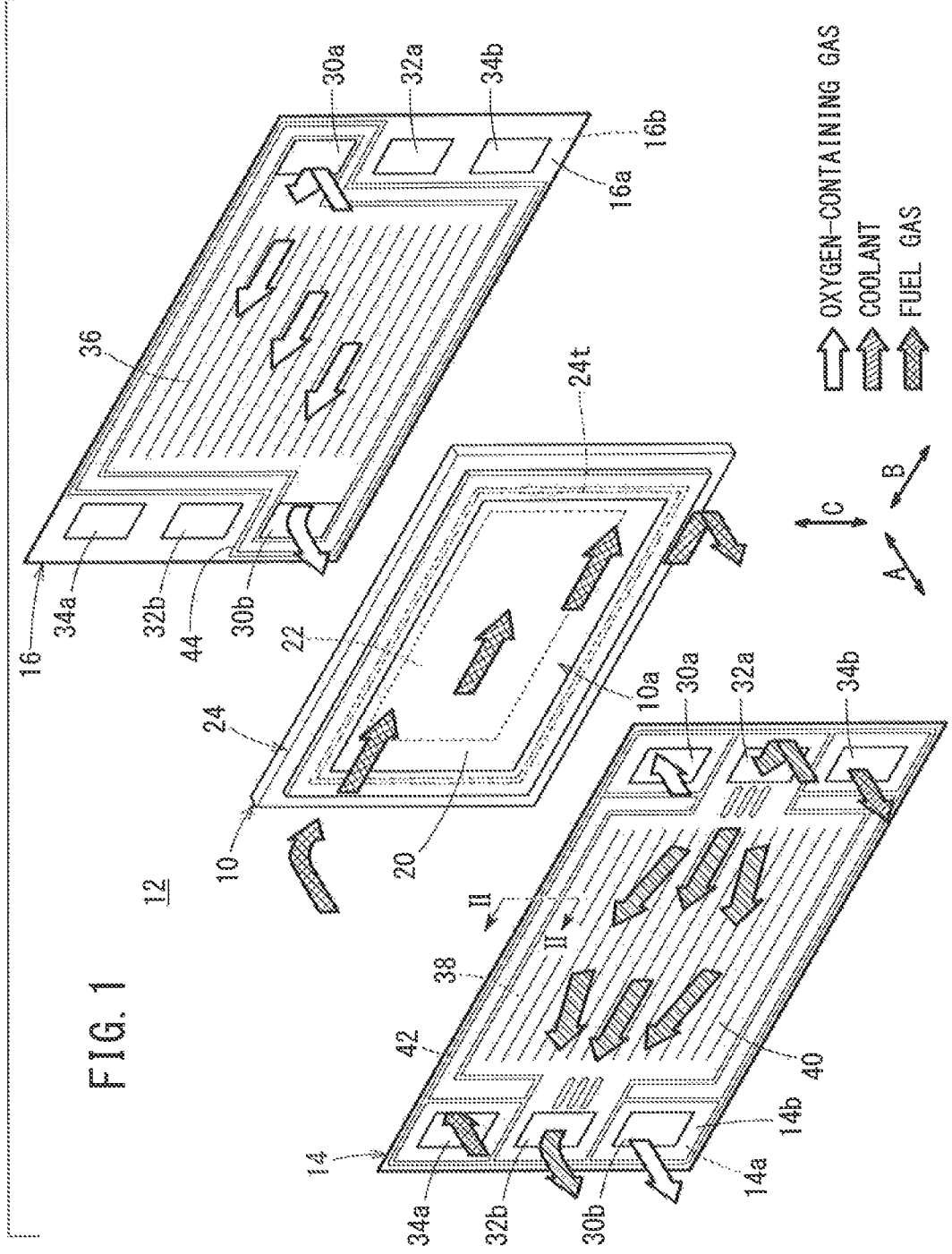
FIG. 1 is an exploded perspective view showing main components of a solid polymer power generation cell including a resin frame equipped membrane electrode assembly according to an embodiment of the present invention.
Figure 2:
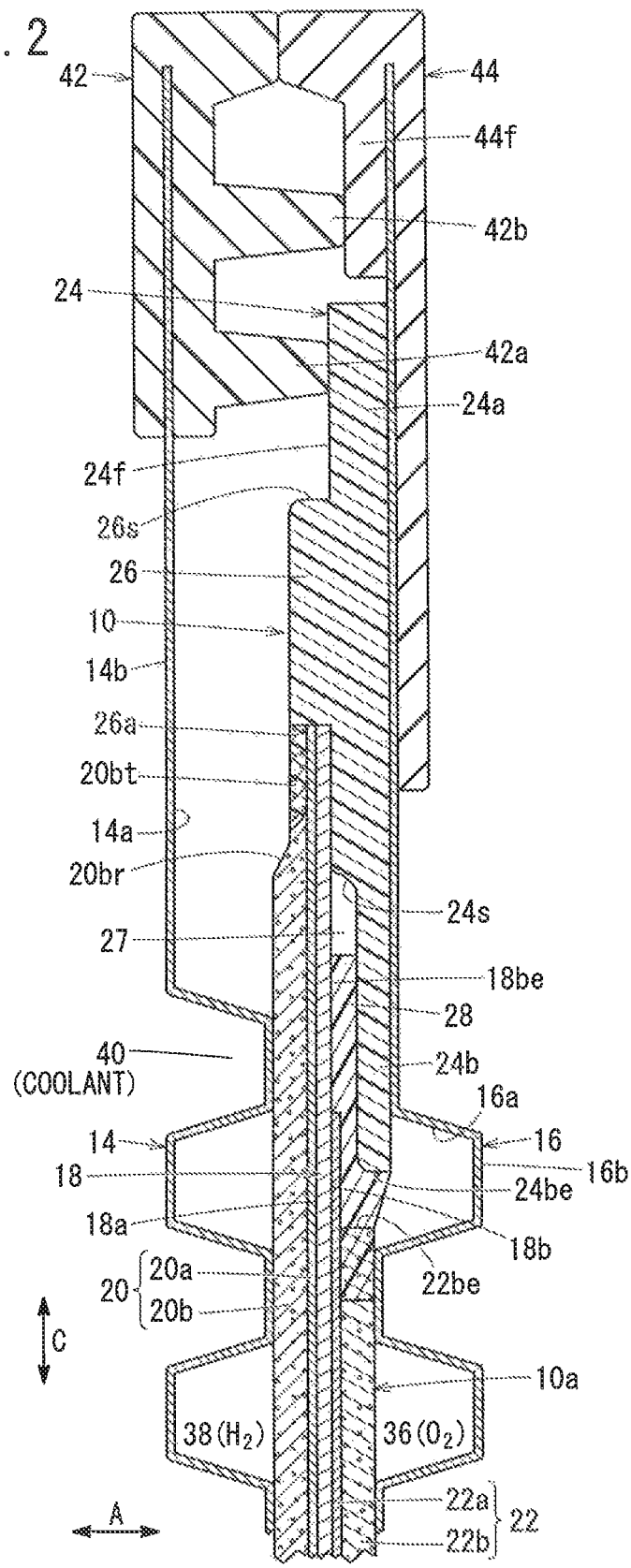
FIG. 2 is a cross-sectional view taken along line II-II of FIG. 1 showing the power generation cell.

As shown in FIGS. 1 and 2, a resin frame equipped membrane electrode assembly 10 according to the embodiment of the present invention is incorporated in a laterally elongated (or longitudinally elongated) rectangular solid polymer power generation cell 12. A plurality of the power generation cells 12 are stacked together in a horizontal direction as indicated by the arrow A, or in a direction of gravity as indicated by the arrow C, in order to form a fuel cell stack. For example, the fuel cell stack is mounted in a fuel cell electric automobile (not shown) as an in-vehicle fuel cell stack.

The power generation cell 12 is formed by sandwiching the resin frame equipped membrane electrode assembly 10 between a first separator 14 and a second separator 16. Each of the first separator 14 and the second separator 16 has a laterally elongated (or longitudinally elongated) rectangular shape. For example, the first separator 14 and the second separator 16 are made of metal plates such as steel plates, stainless steel plates, aluminum plates, plated steel sheets, or metal plates having anti-corrosive surfaces produced by performing a surface treatment. Alternatively, carbon members may be used as the first separator 14 and the second separator 16.

Figure 3:
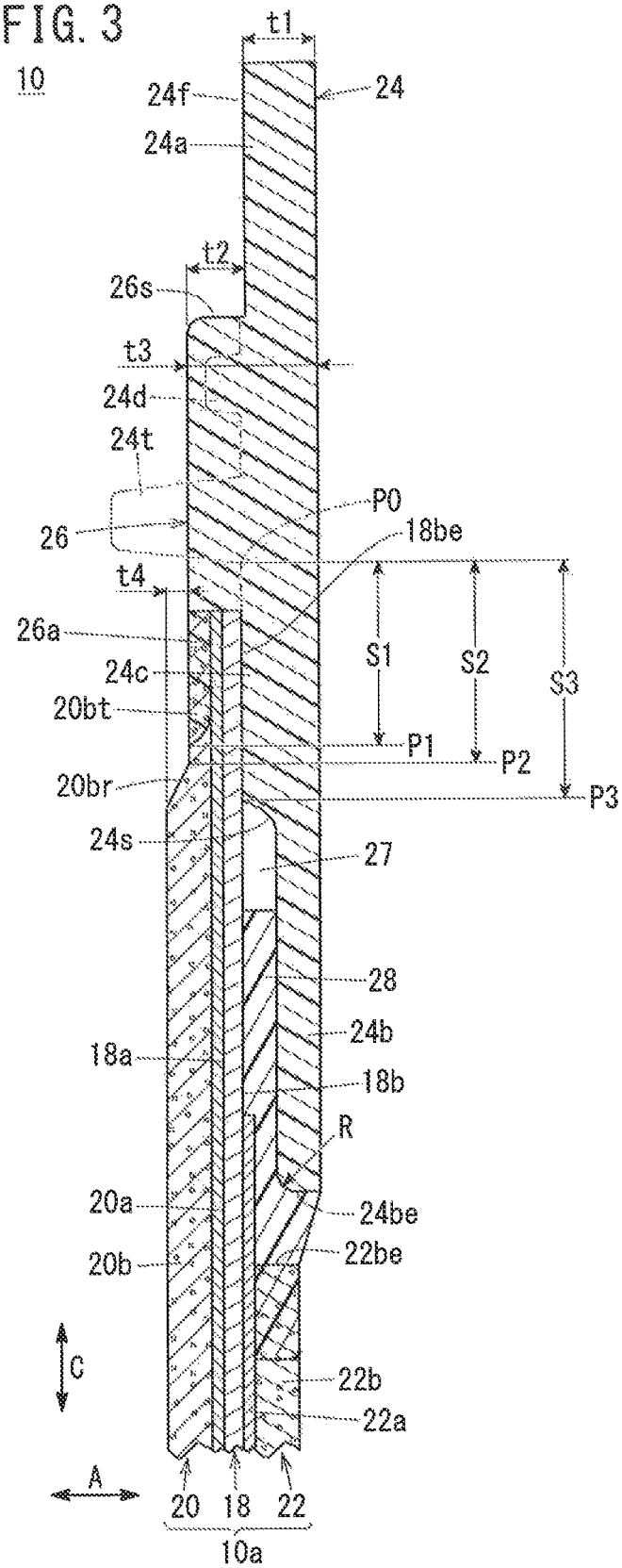
FIG. 3 is a cross-sectional view showing main components of the resin frame equipped membrane electrode assembly.

As shown in FIGS. 1 through 3, the resin frame equipped membrane electrode assembly 10 includes a stepped MEA (membrane electrode assembly having different sizes of components) 10a. The MEA 10a includes a solid polymer electrolyte membrane (cation ion exchange membrane) 18 formed by impregnating a thin membrane of perfluorosulfonic acid with water, for example. The solid polymer electrolyte membrane 18 is interposed between an anode (first electrode) 20 and a cathode (second electrode) 22. A fluorine based electrolyte may be used as the solid polymer electrolyte membrane 18. Alternatively, an HC (hydrocarbon) based electrolyte may be used as the solid polymer electrolyte membrane 18.

The surface size (outer size) of the cathode 22 is smaller than the surface sizes (outer sizes) of the solid polymer electrolyte membrane 18 and the anode 20. Instead of adopting the above structure, the surface size of the anode 20 may be smaller than the surface sizes of the solid polymer electrolyte membrane 18 and the cathode 22. In this case, the anode 20 serves as the second electrode, and the cathode 22 serves as the first electrode.

As shown in FIGS. 2 and 3, the anode 20 includes a first electrode catalyst layer 20a joined to one surface 18a of the solid polymer electrolyte membrane 18, and a first gas diffusion layer 20b stacked on the first electrode catalyst layer 20a. The surface size of the first electrode catalyst layer 20a and the surface size of the first gas diffusion layer 20b are the same, and are of the same size or smaller than the surface size of the solid polymer electrolyte membrane 18.

The cathode 22 includes a second electrode catalyst layer 22a joined to a surface 18b of the solid polymer electrolyte membrane 18, and a second gas diffusion layer 22b stacked on the second electrode catalyst layer 22a. The second electrode catalyst layer 22a protrudes outwardly from an outer peripheral end surface 22be of the second gas diffusion layer 22b. The surface size of the second electrode catalyst layer 22a is larger than the surface size of the second gas diffusion layer 22b, and smaller than the surface size of the solid polymer electrolyte membrane 18.

It should be noted that the second electrode catalyst layer 22a and the second gas diffusion layer 22b may have the same surface size. Further, the surface size of the second electrode catalyst layer 22a may be smaller than the surface size of the second gas diffusion layer 22b.

The first electrode catalyst layer 20a is formed by uniformly depositing porous carbon particles on the surface of the first gas diffusion layer 20b, together with an ion conductive polymer binder, a platinum alloy being supported on the porous carbon particles. The second electrode catalyst layer 22a is formed by uniformly depositing porous carbon particles on the surface of the second gas diffusion layer 22b, together with an ion conductive polymer binder, a platinum alloy being supported on the porous carbon particles.

Each of the first gas diffusion layer 20b and the second gas diffusion layer 22b are made of a carbon paper or a carbon cloth, etc. The surface size of the second gas diffusion layer 22b is smaller than the surface size of the first gas diffusion layer 20b. The first electrode catalyst layer 20a and the second electrode catalyst layer 22a are formed on both surfaces of the solid polymer electrolyte membrane 18, respectively.

The resin frame equipped membrane electrode assembly 10 is formed around the outer periphery of the solid polymer electrolyte membrane 18, and includes a resin frame member 24 that is joined to the anode 20 and the cathode 22. Instead of the resin frame member 24, a resin film may be used.

For example, the resin frame member 24 is made of PPS (polyphenylene sulfide), PPA (polyphthalamide), PEN (polyethylene naphtalate), PES (polyethersulfone), LCP (liquid crystal polymer), PVDF (polyvinylidene fluoride), silicone resin, fluorine resin, m-PPE (modified polyphenylene ether), PET (polyethylene terephtalate), PBT (polybutylene terephthalate), or modified polyolefin.

The resin frame member 24 is in the shape of a frame, and as shown in FIG. 3, includes a thin portion 24a with a thickness t1 extending over a predetermined length inwardly from an outer peripheral edge portion thereof. The resin frame member 24 includes a thin inner expansion 24b that expands toward the cathode 22 through an inner step 24s (step). The inner expansion 24b has an inner peripheral end surface 24be having a rounded portion (curved surface) at an inner corner thereof. As shown in FIG. 3, the resin frame member generally includes a frame inner periphery which overlaps with the MEA in the thickness direction and a frame outer periphery which is non-overlapping with the MEA in the thickness direction, and includes the thin portion 24a.

The resin frame member 24 includes a shelf 24c at the outer peripheral end of the inner expansion 24b. Through the inner step 24s, the shelf 24c becomes thicker in the thickness direction than the inner peripheral portion of the inner expansion 24b, and the shelf 24c contacts an outer peripheral surface portion 18be of the solid polymer electrolyte membrane 18.

As shown in FIG. 3, as will be described later, by melting a resin projection 24t, a frame shaped resin melt portion 26 is formed on a surface that is connected to an outer peripheral seal surface 24f of the thin portion 24a. The resin melt portion 26 includes a frame shaped resin impregnation portion 26a. The outer peripheral edge of the first gas diffusion layer 20b of the anode 20 is impregnated with the melted resin as a part of the resin impregnation portion 26a. The outer peripheral edge of the first gas diffusion layer 20b includes an outer marginal thin portion 20bt which is compressed in the thickness direction, and the resin impregnation portion 26a is provided at the outer marginal thin portion 20bt. The resin melt portion 26 forms a flat surface without any step from the outermost peripheral portion to the resin impregnation portion 26a.

The resin frame member 24 includes a frame shaped bank 24d. The bank 24d is positioned outside the resin projection 24t, and is thinner than the resin projection 24t in the thickness direction. After the resin projection 24t is melted, the bank 24d is embedded in the resin melt portion 26. A thin portion 24a is provided at the outermost peripheral portion of the resin frame member 24 through a step 26s at the outermost peripheral portion of the resin melt portion 26. The thin portion 24a is thinner than the resin melt portion 26 in the thickness direction.

The thin portion 24a has a thickness t1, and the thickness of the resin melt portion 26 is increased by a thickness t2, from the outer peripheral seal surface 24f which is a surface of the thin portion 24a. The resin melt portion 26 has a thickness t3 as a whole which is greater than the thickness t1 of the thin portion. The thickness at the surface of the resin melt portion 26 is reduced from the surface of the first gas diffusion layer 20b, by a thickness t4. The first gas diffusion layer 20b is inclined inwardly toward the resin impregnation portion 26a through an inclined surface 20br, and is thinly formed. As shown in FIG. 3, the thin portion 24a is positioned outward of the resin melt portion 26 in a direction extending from the center of the resin frame equipped MEA toward the outer periphery of the resin frame equipped MEA.

A distance S1 is determined from a melting origin position P0 of the resin projection 24t to an impregnation area origin position P1 which is an inner peripheral end of the resin impregnation area 26a (resin melt portion 26). A distance S2 is determined from the melting origin position P0 to a thin portion origin position P2 which is an inner end of the outer marginal thin portion 20bt of the first gas diffusion layer 20b. Further, a distance S3 is determined from the melting starting position P0 to a shelf origin position P3 of the shelf 24c.

More specifically, the distances S1, S2, and S3 are set to satisfy the relationship S1<S2<S3. The shelf origin position P3 of the shelf 24c, the thin portion origin position P2 of the outer marginal thin portion 20bt of the first gas diffusion layer 20b, and the resin area origin position P1 of the resin melt portion 26 line up outwards in this order, and are spaced from one another. Stated otherwise, the shelf origin position P3, the thin portion origin position P2, and the impregnation area origin position P1 are arranged from a central portion of the resin frame equipped membrane electrode assembly 10 toward the outside.

As shown in FIGS. 2 and 3, a filling chamber 27 is formed between the inner expansion 24b and the MEA 10a. An adhesive layer 28 is formed in the filling chamber 27. As the adhesive layer 28, for example, a liquid seal or a hot melt adhesive may be provided. The adhesive is not restricted to a liquid or solid adhesive, and is not restricted to a thermoplastic or thermosetting adhesive.

As shown in FIG. 1, at one end of the power generation cell 12 in a horizontal direction as indicated by the arrow B, an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the stacking direction as indicated by the arrow A. The oxygen-containing gas is supplied through the oxygen-containing gas supply passage 30a, and the coolant is supplied through the coolant supply passage 32a. A fuel gas such as a hydrogen-containing gas is discharged through the fuel gas discharge passage 34b. The oxygen-containing gas supply passage 30a, the coolant supply passage 32a, and the fuel gas discharge passage 34b are arranged in a vertical direction as indicated by the arrow C.

At the other end of the power generation cell 12 in the direction of the arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction of the arrow A. The fuel gas supply passage 34a, the coolant discharge passage 32b, and the oxygen-containing gas discharge passage 30b are arranged in the direction of the arrow C.

The second separator 16 has an oxygen-containing gas flow field 36 on a surface 16a thereof facing toward the resin frame equipped membrane electrode assembly 10. The oxygen-containing gas flow field 36 is connected to the oxygen-containing gas supply passage 30a and the oxygen-containing gas discharge passage 30b. The oxygen-containing gas flow field 36 includes a plurality of straight flow grooves (or wavy flow grooves) that extend in the direction of the arrow B.

The first separator 14 has a fuel gas flow field 38 on a surface 14a thereof facing toward the resin frame equipped membrane electrode assembly 10. The fuel gas flow field 38 is connected to the fuel gas supply passage 34a and the fuel gas discharge passage 34b. The fuel gas flow field 38 includes straight flow grooves (or wavy flow grooves) that extend in the direction of the arrow B.

A coolant flow field 40 is formed between a surface 14b of the first separator 14 and a surface 16b of the second separator 16. The coolant flow field 40 is connected to the coolant supply passage 32a and the coolant discharge passage 32b. The coolant flow field 40 extends in the direction of the arrow B.

As shown in FIGS. 1 and 2, a first seal member 42 is formed integrally with the surfaces 14a, 14b of the first separator 14, and extends around the outer peripheral end of the first separator 14. A second seal member 44 is formed integrally with the surfaces 16a, 16b of the second separator 16, and extends around the outer peripheral end of the second separator 16.

As shown in FIG. 2, the first seal member 42 includes a first ridge seal 42a that contacts the outer peripheral seal surface 24f of the resin frame member 24 of the resin frame equipped membrane electrode assembly 10, and a second ridge seal 42b that contacts the second seal member 44 of the second separator 16. The surface of the second seal member 44, which contacts the second ridge seal 42b, forms a flat seal 44f having a uniform thickness extending along the separator surface. It should be noted that, instead of using the second ridge seal 42b, a ridge seal (not shown) may be provided on the second seal member 44, and a flat seal may be provided on the first seal member 42.

Each of the first seal member 42 and the second seal member 44 is an elastic seal member made of a seal material, a cushion material, or a packing material such as EPDM (ethylene propylene diene monomer), NBR (nitrile butadiene rubber), fluorine rubber, silicone rubber, fluorosilicone rubber, butyl rubber, natural rubber, styrene rubber, chloroprene rubber, or acrylic rubber.

Next, a method of producing the resin frame equipped membrane electrode assembly 10 will be described.

Figure 4:
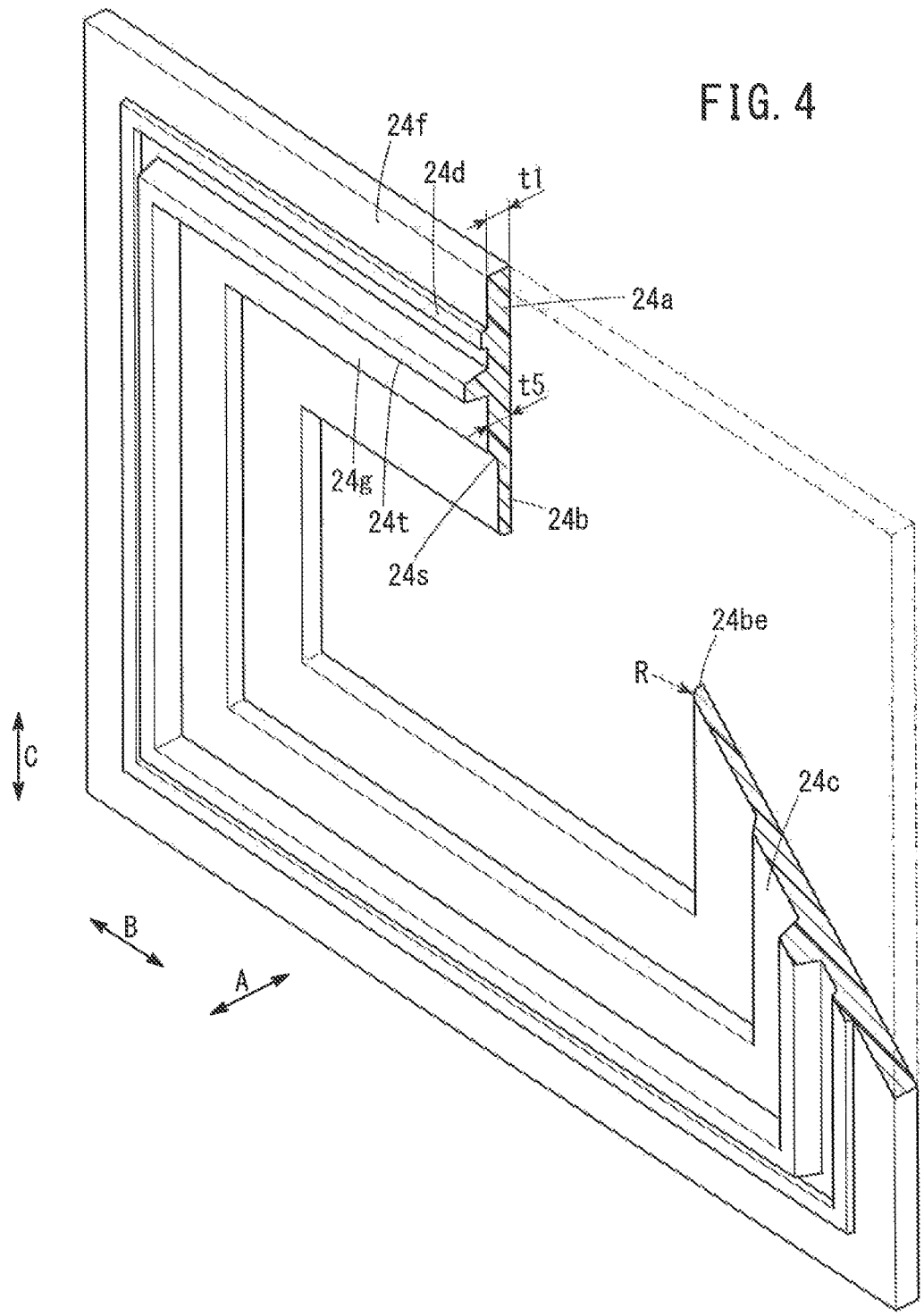
FIG. 4 is a partial cross-sectional view showing a resin frame member of the resin frame equipped membrane electrode assembly.

At first, the MEA 10a is produced, and the resin frame member 24 is formed by injection molding using a die (not shown). As shown in FIG. 4, the resin frame member 24 includes the thin portion 24a having a thickness t1 on the outer peripheral end thereof, and includes an inner portion 24g provided inside the thin portion 24a. The inner portion 24g has a thickness t5. The thickness t1 and the thickness t5 may be the same or may be different from each other. The resin projection 24t and the bank 24d protrude integrally from the inner portion 24g in the thickness direction. Each of the resin projection 24t and the bank 24d has a frame shape. A thin inner expansion 24b is formed integrally with an inner peripheral end of the inner portion 24g through an inner step 24s.

Then, an adhesive is applied to the outer peripheral surface portion 18be of the solid polymer electrolyte membrane 18, for example, using a dispenser (not shown). In a state in which the adhesive is applied to the outer peripheral surface portion 18be of the solid polymer electrolyte membrane 18, the portion thereof adjoining the outer peripheral surface portion 18be of the solid polymer electrolyte membrane 18 and the inner expansion 24b of the resin frame member 24 is heated and pressurized. As a result, the adhesive is hardened in order to form an adhesive layer 28.

Figure 5:
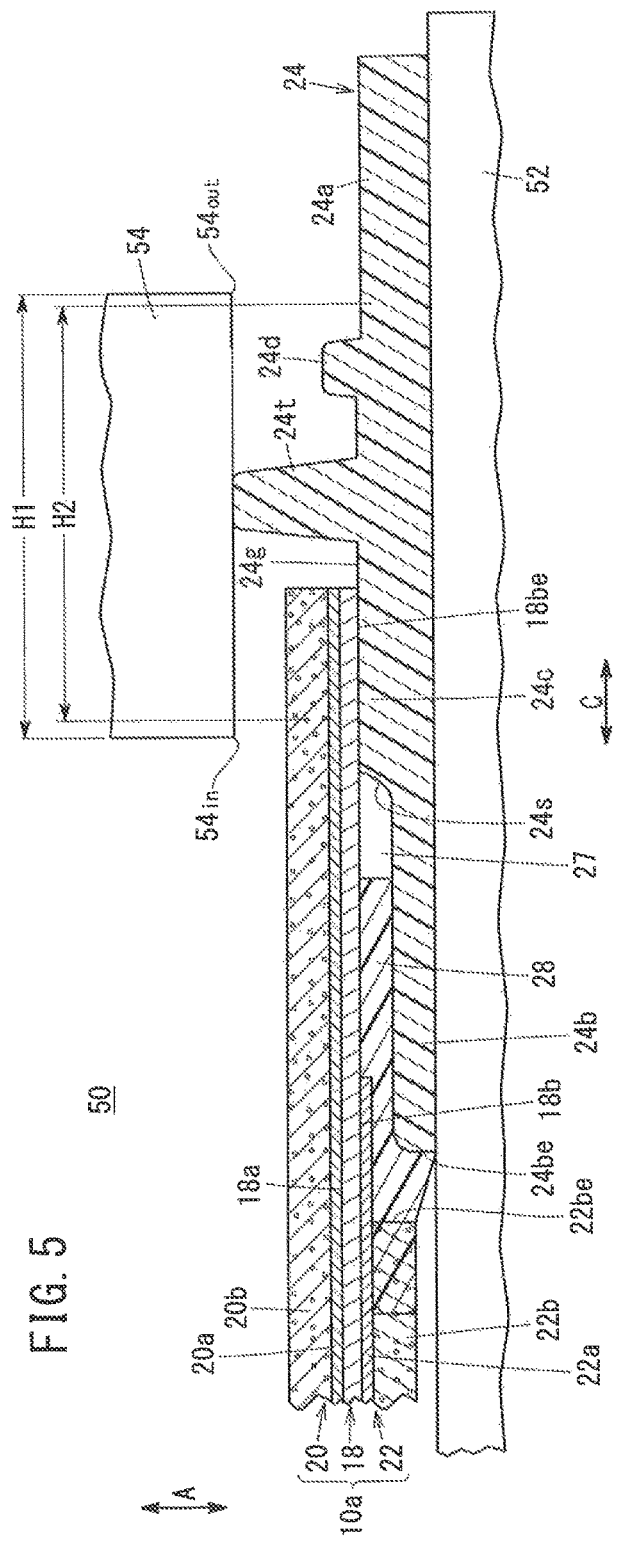
FIG. 5 is a view showing a joining device for melting a resin projection in order to form a resin melt portion.
Figure 6:
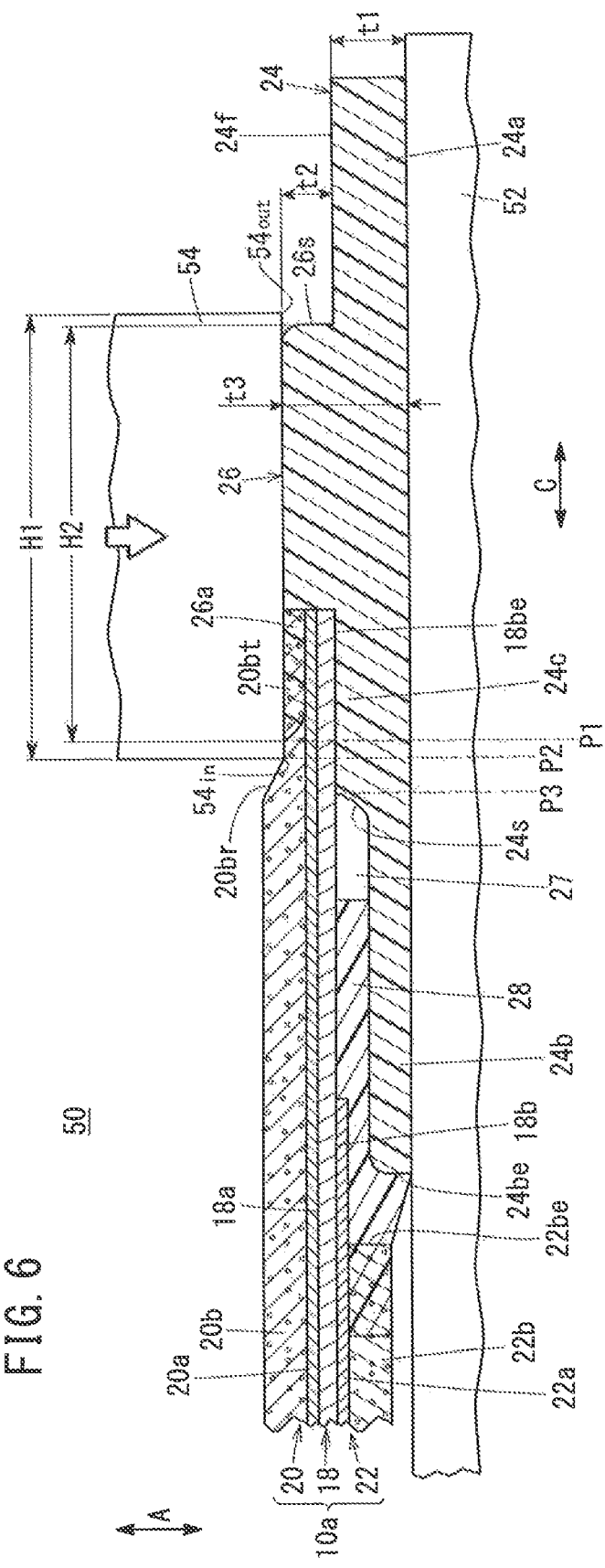
FIG. 6 is a view showing an operation performed by the joining device.

Then, as shown in FIGS. 5 and 6, the resin projection 24t is melted by a joining device 50 in order to form the resin melt portion 26. The joining device 50 includes a base frame (die) 52 and a movable die 54. The resin frame member 24 is placed on the base frame 52. The movable die 54 is capable of moving towards and away from the base frame 52. The movable die 54 has a frame shape, and a dimension H1 thereof in the width direction between an inner end 54in of the movable die 54 and an outer end 54out of the movable die 54 is slightly larger than a dimension H2 of the resin melt portion 26 in the width direction of the resin melt portion 26 (see FIG. 6). The thin portion origin position P2 of the outer marginal thin portion 20*bt* of the first gas diffusion layer 20*b* is determined by the inner end 54in of the movable die 54.

The resin frame member 24 and the MEA 10*a*, which are fixed together by the adhesive layer 28, are placed on the base frame 52. The resin projection 24*t* of the resin frame member 24 is oriented upwardly, and more specifically, is oriented toward the movable die 54. Then, in a state in which the movable die 54 is heated to a predetermined temperature, the movable die 54 is lowered in order to heat and press the resin projection 24*t*.

Therefore, the resin projection 24*t* of the resin frame member 24 is pressed and heated by the movable die 54 and melted. The melted resin projection 24*t* is spread in the width direction of the arrow C along the heating surface of the movable die 54. The outer peripheral edge of the first gas diffusion layer 20*b* is impregnated with a portion of the melted resin which flows inside, whereas the remainder of the melted resin flows outside beyond the bank 24*d* and reaches the end of the thin portion 24*a*.

As shown in FIG. 6, the movable die 54 stops at a position spaced from the outer peripheral seal surface 24*f* of the resin frame member 24 by a distance corresponding to the thickness t2. Therefore, the resin projection 24*t* is melted, and the resin melt portion 26 is formed. At this time, the first gas diffusion layer 20*b* is impregnated with the melted resin of the resin impregnation portion 26*a* (hereinafter, the resin impregnation portion 26*a* is also referred to as a "resin impregnation area 26*a*"), and the outer peripheral edge of the first gas diffusion layer 20*b* is compressed to the thickness of the resin impregnation portion 26*a*. Therefore, the MEA 10*a* and the resin frame member 24 are joined, and the MEA 10*a* and the resin frame member 24 are taken out of the joining device 50 together. In this manner, the resin frame equipped membrane electrode assembly 10 is produced (see FIG. 3).

As shown in FIG. 2, the resin frame equipped membrane electrode assembly 10 is sandwiched between the first separator 14 and the second separator 16. The second separator 16 contacts the inner expansion 24*b* of the resin frame member 24. The second separator 16 and the first separator 14 jointly apply a load to the resin frame equipped membrane electrode assembly 10. Further, a predetermined number of power generation cells 12 are stacked together, and a tightening load is applied to the components between end plates (not shown).

Operations of the power generation cell 12 having the above structure will be described below.

Initially, as shown in FIG. 1, an oxygen-containing gas is supplied to the oxygen-containing gas supply passage 30*a*, and a fuel gas such as a hydrogen-containing gas is supplied to the fuel gas supply passage 34*a*. Further, a coolant such as pure water, ethylene glycol, or oil is supplied to the coolant supply passage 32*a*.

Thus, the oxygen-containing gas flows from the oxygen-containing gas supply passage 30*a* to the oxygen-containing gas flow field 36 of the second separator 16. The oxygen-containing gas moves in the direction of the arrow B, whereupon the oxygen-containing gas is supplied to the cathode 22 of the MEA 10*a*. Meanwhile, the fuel gas is supplied from the fuel gas supply passage 34*a* to the fuel gas flow field 38 of the first separator 14. The fuel gas flows along the fuel gas flow field 38 in the direction of the arrow B, whereupon the fuel gas is supplied to the anode 20 of the MEA 10*a*.

Thus, in the MEA 10*a*, the oxygen-containing gas supplied to the cathode 22 and the fuel gas supplied to the anode 20 are consumed by electrochemical reactions in the second electrode catalyst layer 22*a* and the first electrode catalyst layer 20*a*, thereby generating electricity.

Next, the oxygen-containing gas that was partially consumed at the cathode 22 is discharged along the oxygen-containing gas discharge passage 30*b* in the direction of the arrow A. Likewise, the fuel gas that was partially consumed at the anode 20 is discharged along the fuel gas discharge passage 34*b* in the direction of the arrow A.

Further, the coolant that is supplied to the coolant supply passage 32*a* is introduced to the coolant flow field 40 between the first separator 14 and the second separator 16. Thereafter, the coolant flows in the direction of the arrow B. After the coolant has cooled the MEA 10*a*, the coolant is discharged from the coolant discharge passage 32*b*.

In the embodiment of the present invention, as shown in FIGS. 2 and 3, the thin portion 24*a* is provided at the outermost peripheral portion of the resin frame member 24 through the step 26*s* at the outermost peripheral portion of the resin melt portion 26. The thin portion is thinner than the resin melt portion 26 in the thickness direction. Therefore, as shown in FIGS. 5 and 6, when the resin projection 24*t* is melted by the joining device 50 in order to form the resin melt portion 26, heat due to heat input is not easily transmitted to the outermost peripheral portion of the resin frame member 24.

Thus, at the thin portion 24*a* of the resin frame member 24, it is possible to prevent deformation and occurrence of melting, etc., due to heat input. Thus, when the resin melt portion 26 is provided, the outer peripheral surface of the resin frame member 24, in particular the outer peripheral seal surface 24*f* of the thin portion 24*a*, is not affected by heat, and an advantage is obtained in that a desired seal surface can be provided on the resin frame member 24.

Further, in the embodiment of the present invention, as shown in FIGS. 3 and 5, the resin frame member 24 includes the bank 24*d*. The bank 24*d* is positioned outside the resin projection 24*t*, and is thinner than the resin projection 24*t* in the thickness direction. By melting the resin projection 24*t*, the bank 24*d* is buried within the resin melt portion 26. Therefore, when the resin projection 24*t* is melted by the movable die 54, and the melted resin flows toward the outer peripheral side (outer peripheral seal surface 24*f*) of the resin frame member 24, the bank 24*d* functions as a barrier (resistance) against the melted resin.

Therefore, the melted resin does not flow excessively toward the outer peripheral side of the resin frame member 24, and it is possible to reliably maintain a smooth outer peripheral seal surface 24*f* having a desired width. Accordingly, it becomes possible to more reliably suppress the occurrence of deformation or unevenness in the outer peripheral seal surface 24*f*.

In the embodiment of the present invention, as shown in FIGS. 2 and 3, the distance S1 is determined from the melting origin position P0 of the resin projection 24*t* to the impregnation area origin position P1 of the resin impregnation area 26*a*. Further, the distance S2 is determined from the melting origin position P0 to the thin portion origin position P2 of the first gas diffusion layer 20*b*, and the distance S3 is determined from the melting origin position P0 to the shelf origin position P3 of the shelf 24*c*.

More specifically, the distances S1, S2, and S3 are set to satisfy the relationship S1<S2<S3. Stated otherwise, the shelf origin position P3, the thin portion origin position P2, and the impregnation area origin position P1 are arranged successively from a central portion to the outside of the resin frame equipped membrane electrode assembly 10.

Therefore, as shown in FIG. 6, at the time of being impregnated with the melted resin of the resin projection 24*t*, the shelf origin position P3 of the shelf 24*c* of the resin frame member 24, which functions as a receiver for the resin impregnation area 26*a*, is positioned inside of the thin portion origin position P2 and the impregnation area origin position P1. Thus, as shown in FIG. 6, the resin impregnation area of the movable die (die member) 54, which applies heat and pressure at the time of impregnation, is positioned within the area of the shelf 24*c* of the resin frame member 24, and the load of the movable die 54 can be received reliably by the shelf 24*c*. Accordingly, with a simple structure, it becomes possible to suppress damage from occurring to the resin frame member 24 insofar as possible, and to reliably and easily obtain the resin impregnation area 26*a* having a stable quality.

While the invention has been particularly shown and described with reference to a preferred embodiment, it will be understood that variations and modifications can be effected thereto by those skilled in the art without departing from the scope of the invention as defined by the appended claims.

What is claimed is:

1. A resin frame equipped membrane electrode assembly (MEA) for a fuel cell comprising:
    an MEA including a first electrode provided on one surface of a solid polymer electrolyte membrane, and a second electrode provided on another surface of the solid polymer electrolyte membrane, the first electrode including a first electrode catalyst layer and a first gas diffusion layer, the second electrode including a second electrode catalyst layer and a second gas diffusion layer, and the surface size of the first electrode being larger than the surface size of the second electrode; and
    a resin frame member provided around the solid polymer electrolyte membrane, wherein
    a resin melt portion is provided for the resin frame member, the inside of the first gas diffusion layer being impregnated with part of the resin melt portion;
    each of the resin frame member and the resin melt portion extends along an outer circumference of the solid polymer electrolyte membrane;
    a thin portion is provided all around an outermost peripheral portion of the resin frame member through a step provided all around an outermost peripheral portion of the resin melt portion, and the thin portion is thinner than the resin melt portion in a thickness direction; and
    the resin frame member includes a frame inner periphery which overlaps with the MEA in the thickness direction and a frame outer periphery which is non-overlapping with the MEA in the thickness direction, and the thin portion is part of the frame outer periphery and is positioned outward of the resin melt portion in a direction extending from a center of the resin frame equipped MEA toward an outer periphery of the resin frame equipped MEA, and
    wherein an outer peripheral edge of the first gas diffusion layer includes an outer marginal thin portion which is thinner in the thickness direction than an adjacent portion of the first gas diffusion layer, and the resin impregnation portion is provided at the outer marginal thin portion.

* * * * *